G. W. TOLHURST.
Rotary Harrow.
No. 17,121.
Patented Apr. 21, 1857.
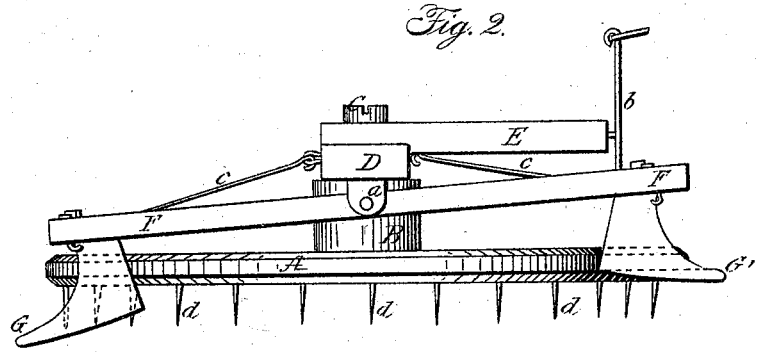
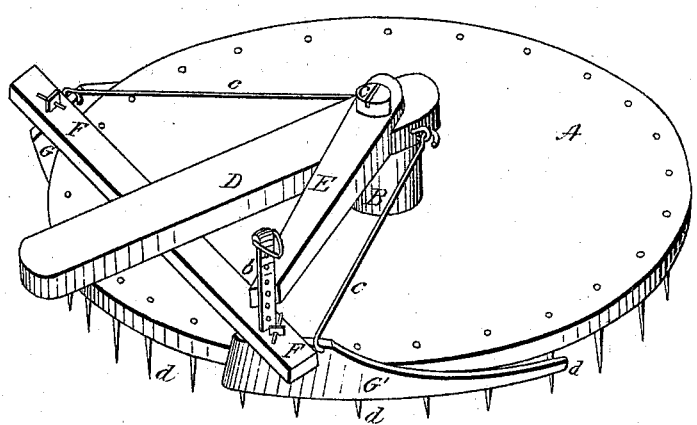

UNITED STATES PATENT OFFICE.

GEO. W. TOLHURST, OF CLEVELAND, OHIO.

IMPROVEMENT IN HARROWS.

Specification forming part of Letters Patent No. 17,121, dated April 21, 1857.

*To all whom it may concern:*

Be it known that I, GEORGE W. TOLHURST, of Cleveland, in the county of Cuyahoga and State of Ohio, have invented certain new and useful Improvements in Rotating Harrows; and I do hereby declare the following to be a full, clear, and exact description of the same, reference being had to the accompanying drawings, making a part thereof, in which—

Figure 1 represents a perspective view, and Fig. 2 a side elevation, of the machine.

Similar letters of reference, where they occur in the separate figures, denote like parts of the machine in both.

The nature of my invention relates to a harrow which can be rotated to the right or left by simply dragging it across the ground, as the operator may desire or the slope of the ground may require.

To enable others skilled in the art to make and use my invention, I will proceed to describe the same, with reference to the drawings.

A represents a disk or frame, which may be solid or made with a center, arms, and rim, like an ordinary carriage-wheel. To the center of this frame A may be attached a boss or hub, B, and to this hub is connected, by a screw-bolt, C, or otherwise, a secondary frame, composed of the arms D E and a cross-bar, F, so that the under frame or disk, A, may freely turn on the secondary frame. The cross-bar F is pivoted at its center $a$, Fig. 2, to the arm D, and at each end of said bar are fastened shoes or shield-pieces G G, which curve around somewhat in the shape of the frame A. At one end of the bar F there is a catch-piece, $b$, furnished with holes, and in the end of the arm E there is a pin, over which any of the holes in the catch-piece will take, for holding said bar F and the shield-pieces upon it at any inclination with regard to the frame A.

$c$ $c$ are stay-rods, running from the after part of the arm D to the shield-pieces, for strengthening the parts.

The perimeter of the frame A is armed with teeth $d$ $d$, &c., which, if not in any manner thrown out of action, would all equally hold in the ground, and the harrow would move over the ground without revolving around its center; but if, as in Fig. 2, the shield-piece G be let down by tipping the bar F, so that it will be as low as the points of the teeth on that side of the harrow, then the shield-piece sustains the harrow on that side, and not the teeth. If, now, the harrow be drawn forward, the teeth on the opposite side of the harrow from G will hold in the ground, and the whole frame A will turn horizontally on its center support. Reverse the action of the shield-pieces by raising G and lowering G', and the harrow will then turn in the opposite direction. Thus the forward motion of the harrow is caused to make it rotate to the right or to the left, just as the nature of the ground may require.

I am aware that harrows have been made to rotate by dragging them across the field, but they always rotate in one direction. This, of course, I lay no claim to, my object being to cause the harrow to rotate to the right or to the left, as circumstances may require; and I effect my rotation differently from any others of which I have knowledge. I do it by the harrow-teeth themselves, while in the other plans one or more auxiliary wheels are used for the rotation, which is then only in one continuous direction.

Having thus fully described the nature of my invention, what I claim therein as new, and desire to secure by Letters Patent, is—

The adjustable shield-pieces G G', in combination with the rotary harrow, substantially in the manner and for the purpose as described.

G. W. TOLHURST.

Witnesses:
 THOS. H. UPPERMAN,
 E. COHEN.